United States Patent [19]

Fox et al.

[11] 4,163,589

[45] Aug. 7, 1979

[54] HINGE JOINT FOR TRACK LINK ASSEMBLIES

[75] Inventors: Lawrence E. Fox, Peoria; James R. Shuler, Eureka, both of Ill.

[73] Assignee: Caterpillar Tractor Co., Peoria, Ill.

[21] Appl. No.: 899,771

[22] Filed: Apr. 24, 1978

[51] Int. Cl.² .............................................. B62D 55/20
[52] U.S. Cl. ......................................... 305/14; 74/254; 305/59; 403/155
[58] Field of Search ............... 305/58 R, 59, 14, 11; 74/257, 254, 251 C, 251 R; 403/DIG. 7, 326, 360, 155, 154

[56] References Cited

U.S. PATENT DOCUMENTS

| | | | |
|---|---|---|---|
| 2,823,081 | 2/1958 | Mayo | 305/59 X |
| 3,235,315 | 2/1966 | Schnacke | 305/11 |
| 3,762,778 | 10/1973 | Boggs et al. | 305/14 |
| 3,841,718 | 10/1974 | Reinsma | 305/11 |
| 4,120,537 | 10/1978 | Roley et al. | 305/59 X |

FOREIGN PATENT DOCUMENTS 1114104  9/1961  Fed. Rep. of Germany ............. 305/11

*Primary Examiner*—John P. Shannon
*Attorney, Agent, or Firm*—Wegner, Stellman, McCord, Wiles & Wood

[57] ABSTRACT

A track link assembly including two meshed track links, one having a narrow end received in a notch in an enlarged end in the other, aligned bores in the links, a hinge pin received in the bore for pivoting the links together, annular grooves at opposite ends of the pins, retaining rings in the grooves, recesses in one of the links about the bore therein adjacent the ends of the pin and defining shoulders substantially abutted by the retaining rings, and caps closing the recesses and having axial portions about the periphery of the respective retaining rings for preventing radial movement thereof.

8 Claims, 2 Drawing Figures

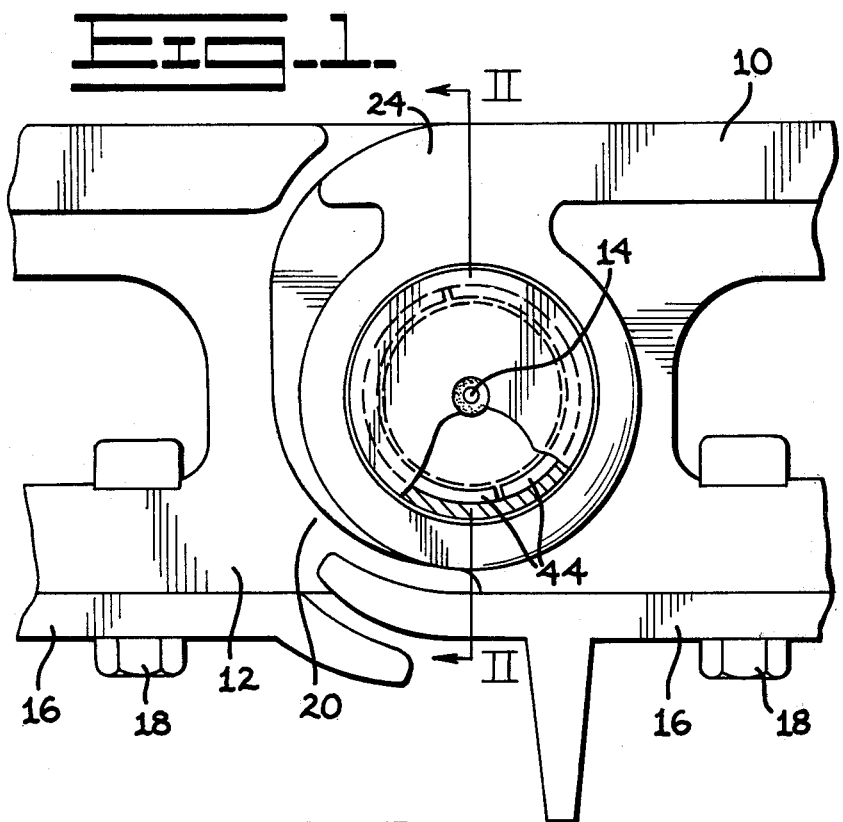
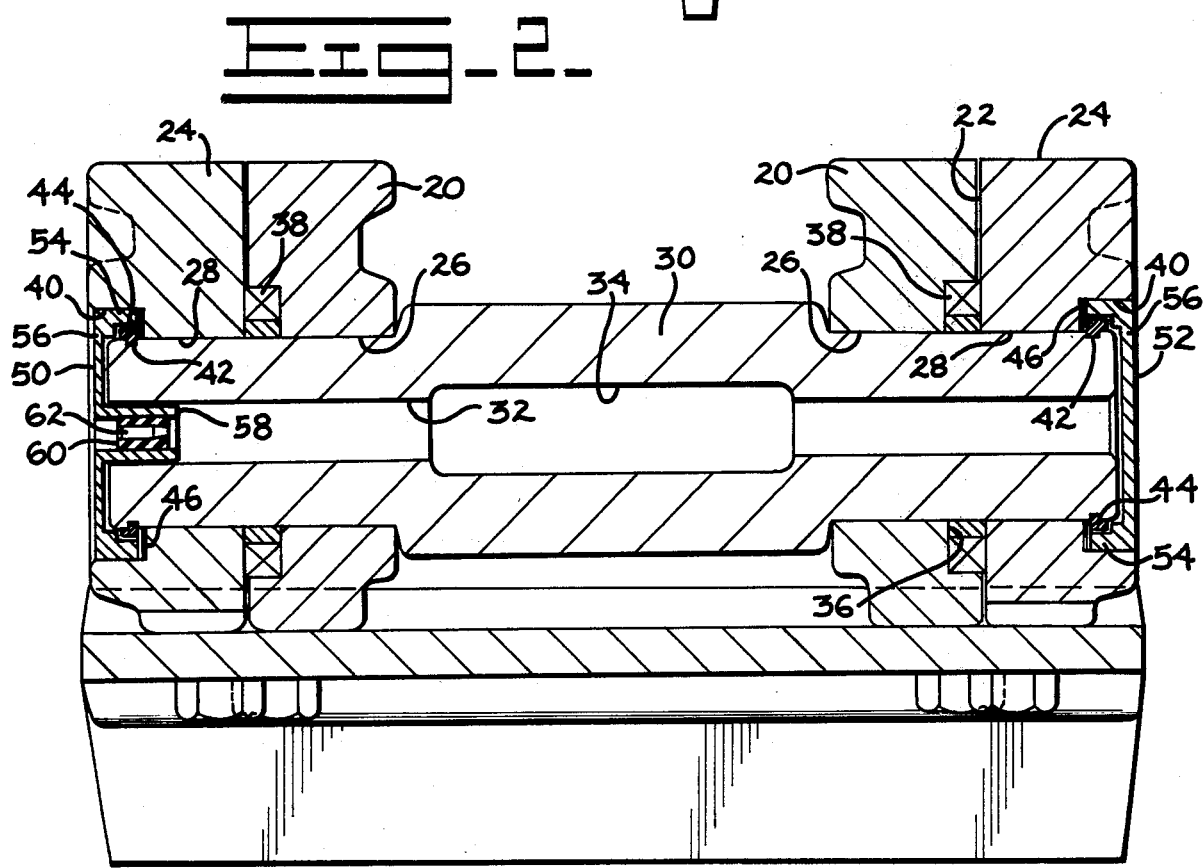

HINGE JOINT FOR TRACK LINK ASSEMBLIES

BACKGROUND OF THE INVENTION

This invention relates to hinge joints as, for example, those employed to secure track links together for crawler type vehicles.

Track links have been typically difficult to service due to their size, weight, and the considerable use of press or force fits between components. Because of the severe environments in which many crawler-type vehicles employing track links are utilized, frequent servicing is required. Because of the difficulty in servicing such links, and the need for relatively frequent servicing, maintenance procedures are of considerable expense to the owners of such vehicles.

SUMMARY OF THE INVENTION

The present invention is directed to overcoming one or more of the above problems.

According to the present invention, there is provided an easily serviceable hinge joint including two meshed hinge members having aligned bores therein. A hinge pin is received in the bores for pivoting the members together. Annular grooves are disposed at opposite ends of the pin and retaining rings are located in the groove. Recesses are provided in one or more of the hinge members about the bores therein adjacent the ends of the pins to define shoulders which are substantially abutted by the retaining rings and there are provided caps for closing the recesses. The caps have axial portions about the periphery of their respective retaining rings for preventing radial movement thereof to resist displacement of the rings due to thrust loads imposed thereon.

Other objects and advantages will become apparent from the following specification taken in connection with the accompanying drawings.

DESCRIPTION OF THE DRAWINGS

FIG. 1 is a fragmentary elevation of a hinge joint made according to the invention in a track link assembly with parts broken away for clarity; and FIG. 2 is a vertical section taken approximately along the line 2—2 in FIG. 1.

DESCRIPTION OF THE PREFERRED EMBODIMENT

An exemplary embodiment of a hinge joint made according to the invention will be described herein in connection with a track link assembly for crawler-type vehicles. However, it is to be understood that the hinge joint of the invention is not so limited, and will find substantial use in other applications requiring hinges that must be easily serviceable and which are subjected to substantial thrust loads.

With reference to the drawings, there is seen first and second track links 10 and 12, respectively, which are pivoted together for relative rotation about an axis 14. Each of the links 10 and 12 has track shoes 16 secured to one side thereof by bolts 18.

As best seen in FIG. 2, the link 12 has a narrow end 20 which is received in a recess or notch 22 in the enlarged end 24 of the link 10. Each of the ends 20 and 24 includes a bore 26 and 28, respectively. The bores 26 and 28 receive a hinge pin 30 which is somewhat enlarged at its center, as seen in FIG. 2, and which has an axially extending through bore 32 opening to opposite ends. Within the central portion there is provided an enlarged cavity 34 and in the usual case, the through bore 32 and the cavity 34 are adapted to receive a lubricant and act as a passage and reservoir therefor. The axially outer sides of the end 20 include annular recesses 36 which receive conventional seals 38 which establish a seal between the interfaces of the links 10 and 12 and the pin 30.

Cylindrical recesses 40 are located on the axially outer sides of the end 24 of the link 10 concentrically with the bores 28 and the ends of the pin 30, within the recesses 40, are provided with annular grooves 42. The grooves 42 receive split retaining rings 44 which extend radially outwardly of the surface of the pin 30 within the bores 28 and are in substantial abutment with the bottom of the associated recess 40 which acts as a shoulder restraining relative axial movement. Preferably, annular shims 46, formed of a plastic or an elastomer, are interposed between the axially inner sides of the retaining rings 44 and the bottoms of the respective recesses 40.

To seal the assemblage against leakage from the reservoir defined by the through bore 32 and the chamber 34, cup-shaped caps 50 and 52 are press fitted into the recesses 40. Each of the caps 50 and 52 includes an axial extension 54 which is directed axially inwardly within the associated recess 40 to surround the associated retaining ring 44 to thereby restrain the same against radial movement from the groove 42. Each of the caps 50 and 52 further includes a radially directed portion 56 which is in relatively close proximity to the axially outer side of the associated retaining rings 44 to restrain the same against substantial axial movement.

As a consequence, even though substantial thrust forces are applied to the retaining rings 44, they are effectively restrained from movement out of the grooves 42 to ensure that the restraining function provided thereby will occur.

The cap 50 includes a conduit in the form of tubular projection 58 extending axially inwardly and freely received within one end of the through bore 32. A hollow elastomeric cylinder 60 is disposed within the interior of the tubular projection 58 and the same, in turn, receives a removable plug 62 formed of metal, plastic or the like. When the plug 62 is removed, lubricant can be introduced into the through bore 32 and retained therein simply by replacing the plug 62.

To disassemble the hinge joint for maintenance purposes or the like, it is only necessary to remove the elastomeric cylinder 60 and the plug 62 from the tubular projection 58 as by driving the same axially inwardly into the bore 32. An elongated tool may then be inserted through the interior of the tubular projection 58 to abut against the axially inner side of the cap 52. The application of force to the tool will then cause the cap 52 to be driven out of the recess 40 in which it is received.

Once the cap 52 has been removed, the same tool may be inserted into the through bore 32 and abutted against the axially inner end of the projection 58 to drive the cap 50 from its associated recess 40. At this time, the retaining rings 44 are no longer restrained against radial movement and, by reason of their split nature, may be easily removed from their associated grooves 42 to disassemble the joint.

From the foregoing, it will be appreciated that the use of the end caps 50 and 52 ensures that the joint will be sealed and lubricant disposed within the through bore 32 retained therein to accomplish the purpose of providing lubrication for the components. The caps also provide the dual function of restraining the retaining rings 44 against both radial and axial movement and thereby allow the use of slit retaining rings which are easily handled. The use of the tubular projection 58 and the components associated therewith permits easy replenishment of the lubricant and also provides a means whereby tools may be employed to remove the caps 50 and 52 simply and with a minimum of effort.

The embodiments of the invention in which an exclusive property or privilege is claimed are defined as follows:

1. A track link assembly comprising:
   two meshed track links;
   aligned bores in said links;
   a hinge pin received in said bores for pivoting said links together;
   annular grooves at opposite ends of said pin;
   retaining rings in said grooves;
   recesses in one link about the bore therein adjacent the ends of said pin and defining shoulders substantially abutted by said retaining rings; and
   caps closing said recesses and having axial portions about the periphery of the respective retaining ring for preventing radial movement thereof.

2. The track link of claim 1 wherein said caps have radial portions in substantial adjacency to the respective ring opposite of the associated shoulder to axially restrain the respective ring.

3. The track link of claim 1 wherein said caps are cup-shaped and press fitted into respective ones of said recesses.

4. The track link of claim 3 wherein said pin includes an axially extending lubricant receiving passage and one of said caps includes a sealable conduit projecting into said passage.

5. The track link of claim 1 wherein said pin includes an axial through bore and one of said caps includes an opening to said through bore.

6. The track link of claim 1 further including a shim interposed between each ring and the associated shoulder.

7. A hinged joint comprising: two meshed hinge members; aligned bores in said hinge members; a hinge pin received in said bores for pivoting said members together; annular grooves in said pin at opposite ends thereof; recesses in at least one of said members about the bore therein adjacent the ends of said pin and defining shoulders; retaining rings in said groove and substantially abutting said shoulders; and caps closing said recesses and having axial portions about the periphery of the respective retaining ring for preventing radial movement thereof.

8. The hinged joint of claim 7 wherein said caps are cup-shaped and press fitted into respective ones of said recesses.

* * * * *